United States Patent [19]

Koch

[11] 4,109,976

[45] Aug. 29, 1978

[54] SELF-ALIGNING BUSHING

[75] Inventor: Hans W. Koch, Levittown, Pa.

[73] Assignee: Roller Bearing Company of America, West Trenton, N.J.

[21] Appl. No.: 786,137

[22] Filed: Apr. 11, 1977

[51] Int. Cl.² .................... F16C 33/72; F16C 23/00
[52] U.S. Cl. .................................. 308/36.1; 277/30; 277/212 FB; 308/72
[58] Field of Search ............... 308/29, 36.1, 72, 194, 308/121, 240, 187.1, 187.2; 277/30, 82, 212 FB; 29/148.4 B, 148.4 S, 149.5 B

[56] References Cited

U.S. PATENT DOCUMENTS

| 2,255,172 | 9/1941 | Johnson | 308/36.1 |
| 3,290,073 | 12/1966 | Gottschald | 277/212 FB |
| 4,034,996 | 7/1977 | Manita et al. | 308/72 |

FOREIGN PATENT DOCUMENTS 1,901,908  6/1964  Fed. Rep. of Germany ............ 308/72

Primary Examiner—Trygve M. Blix
Assistant Examiner—Charles E. Frankfort
Attorney, Agent, or Firm—Zachary T. Wobensmith, 2nd; Zachary T. Wobensmith, III

[57] ABSTRACT

A self-aligning bushing is described which includes an inner spherical ball or ring with an outer socket or ring thereon, seals being provided engaged in sockets in an inner face of the outer ring and in sockets in an outer face of the inner ball or ring, the seals being of elastomeric material with built in rims which aid in the retention in the outer sockets and in retaining the shape of the seals, the spaces within the seals retaining lubricant for the contacting surfaces.

2 Claims, 3 Drawing Figures

SELF-ALIGNING BUSHING

BACKGROUND OF THE INVENTION

1. Field of the Invention

This invention relates to a self-aligning bushing and more particularly to improved seals therefor.

2. Description of the Prior Art

It has heretofore been proposed where an interior ball or ring is provided which has an outer spherical surface with the outer ring or socket having a complemental interior surface to provide seals to retain a lubricant for the surfaces and to prevent the entry of dirt and water.

In the Schmidt, U.S. Pat. No. 3,588,201 seals are shown carried by the outer of the movable members which engage the inner member with a wiping action.

The Stella et al., U.S. Pat. No. 3,848,938 also shows seals for a bearing carried by the outer member in wiping engagement with the inner member.

The Elges, British Pat. No. 1,104,877, also shows a seal, retained by a ring on the outer member which is in wiping engagement with the inner member.

Seals of the type just referred to have very limited capacity for storing and retaining lubricant. The wiping action also tends to remove or limit the lubricant where the wiping action occurs and the exposed areas of the inner member are available for the reception of dirt.

Helmut Elges KG, in German Gebrauchsmuster No. 1,901,908 dated June 19, 1964, shows in FIGS. 3 and 3a seals of elastic material disposed at the outer side edges of the inner ring member and extending outwardly and then inwardly with inner enlarged ends directly bearing as in FIG. 3 in flat arcuate grooves in the outer side faces of the outer ring members or with a metal or plastic plate as shwon in FIG. 3a bearing in flat arcuate grooves on the outer side faces of the outer ring members.

The sealing member of the structures heretofore available, and particularly those in which a wiping action is utilized, do not adequately protect the curved contacting surfaces on the inner ring but permit it to be subject to dirt and water. Other sealing members are not adequately secured or mounted at their ends or do not have adequate lubricant capacity.

SUMMARY OF THE INVENTION

In accordance with the invention, a self-aligning bushing is provided having an inner ring or ball with an outer spherical surface and an outer ring or socket with an inner complemental surface engaging the spherical surface, seals being provided of elastomeric material anchored at their ends respectively in the inner curved surface of the outer ring and in the outer curved surface of the inner ball or ring, the seals having built in metallic rings which aid in the anchoring of the outer parts of the seals and the retention of the shapes thereof.

It is the principal object of the invention to provide a self-aligning bushing having improved seals which retain lubricant for the contacting surfaces and which will be effective in their action and have a long useful life.

It is a further object of the invention to provide a self-aligning bushing in which improved anchoring of the seals is provided.

It is a further object of the invention to provide a self-aligning bushing employing preformed seals with initial shaping prior to mounting which aids in the retention of the seals in place.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

Figure 1:
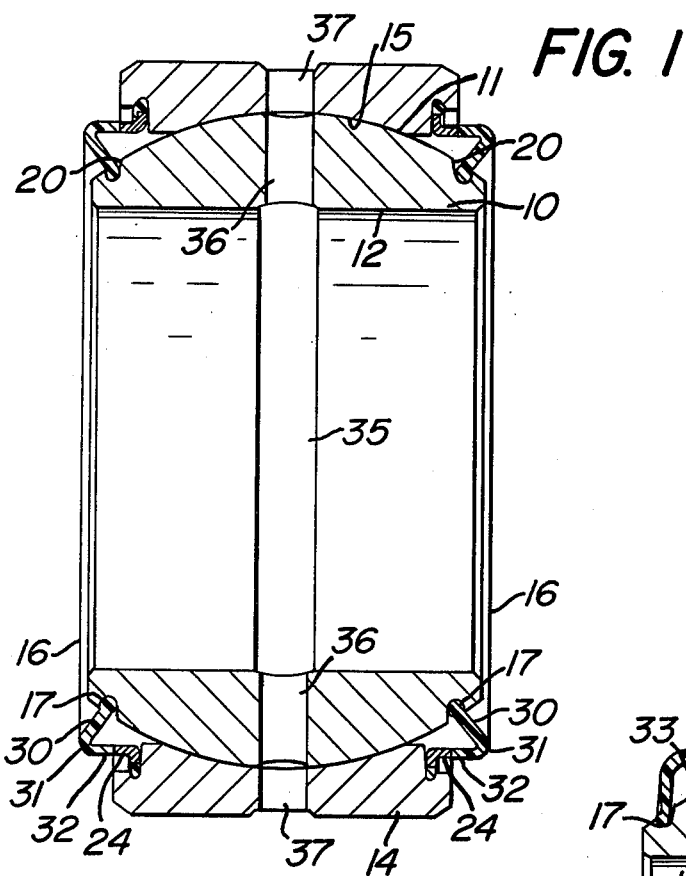
FIG. 1 is a vertical sectional view of a self-aligning bushing in accordance with the invention with the inner ball or ring and the outer ring or socket in axial alignment.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF A PREFERRED EMBODIMENT

Referring now more particularly to the drawings, an inner spherical metallic ball or ring 10 is shown having an outer spherical surface 11 and an inner bore 12 for the reception of a shaft or other desired element (not shown).

An outer socket or ring 14 is provided having an interior surface 15 complemental to the surface 11 for movement with respect thereto.

A seal 16 is provided on each side, preferably of elastomeric material, having an outer enlarged end 17, preferably with portion 18 circular in cross section. The end 17 is engaged in a complemental groove 19 in the surface 11 extending around the outer surface of the ring 10, on each side. The groove 19 is beyond the working portion of the surface 15 and has a wall portion 20 which serves as a limit stop for the seal 16.

The seal 16 also has an enlarged end 21 with substantially parallel sides for reception in a tapered groove 23 in the interior of the ring 14 beyond the surface 15 with a wall 24 at the outer end of the groove 23, the wall 24 serving as a limit stop for the seal 16. The end 21 of the seal 16 is forced into the groove 23 where the end 21 is compressed to retain the end 21 by resilient gripping in the groove 23.

The seal 16 has a built-in metallic ring 25, vulcanized or molded in place if desired, L-shaped in cross section with one leg 27 extending toward the bottom of the groove 23 to aid in the seating and retaining the enlarged end 21 in the groove 23, and a leg 28 extending perpendicularly to the leg 27 to provide a stiffening action to retain the shape of the seal 16 at that location.

The seal 16, extending from the enlarged end 17, has a wall portion 30 hinged at 31 to a unitary wall portion 32. The wall portion 32 extends to the enlarged end 21.

Figure 3:
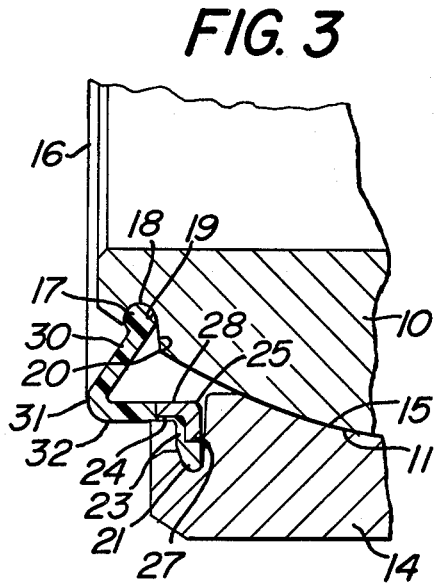
FIG. 3 is a fragmentary sectional view, enlarged, illustrating the details of the seal.

In the making of the seal 16 it is preferable that the wall portions 30 and 32 be molded at a slightly larger angle therebetween than is shown in FIG. 3 to aid in the retention of the seal ends and in position.

The spaces 33 within the wall portions 30 and 32 preferably initially filled with a suitable lubricant.

The bore 12 preferably has an interior circumferential groove 35 with a plurality of radial bores 36 extending outwardly therefrom for the introduction and distribution of lubricant, if desired.

The outer ring 14 can have a plurality of radial bores 37 communicating with the bores 36 for introduction of additional lubricant, if desired.

The mode of operation should be apparent from the foregoing but will be summarized briefly.

FIG. 1 shows the bushing with the transverse axes of the inner and outer rings 10 and 14 in alignment and with the seals 16 in their positions for that condition.

Figure 2:
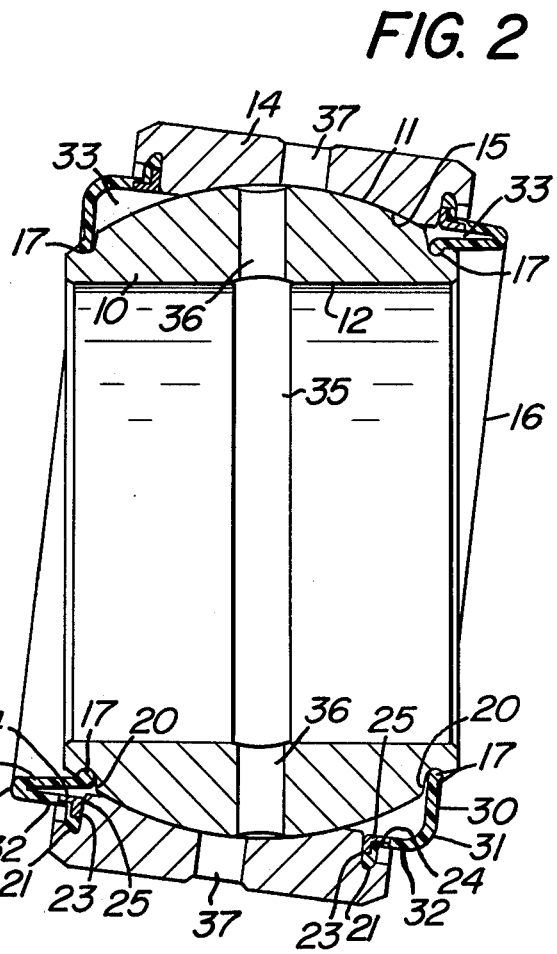
FIG. 2 is a view similar to FIG. 1 showing the outer ring out of alignment with the inner ball or ring.

If now, the axes of the rings 10 and 14 are relatively tilted as shown in FIG. 2 the positions of the wall portions 30 and 31 of the seals 16 will be changed as illustrated in FIG. 2. The seal 16 at the left has top of the seal with the wall portions 30 and 32 at a greater angle and at the bottom of the seal 16 with the wall portion at a smaller angle. This will tend to shift the lubricant in the space 33 from the bottom towards the top while the reverse action is occurring at the seal 16 at the right of FIG. 2.

At the same time the interengaged faces 11 and 15 are protected from dirt and water and adequately lubricated.

The wall portion 20 acts as a stop and prevents withdrawal of the end portion 17 from the groove 19, the end 17 turning in its groove. The wall 24 and the ring 25 prevent dislodgment of the end 21 from the groove 23.

I claim:

1. A self-aligning bushing comprising
    an inner ring having an outer spherical surface with spaced grooves curved in transverse cross section and shaped for seal end retention,
    an outer ring having an inner spherical surface in engagement with the outer surface of said inner ring and having spaced grooves beyond its spherical surface for seal end retention,
    sealing members of elastomeric material for said rings for retaining lubricant and preventing access of dirt and water to the engaging surfaces of said rings,
    each of said sealing members having
        a first enlarged end portion complemental in cross section to and movably mounted in and retained in one of said grooves in said outer spherical surface of said inner ring, and
        a second enlarged end portion in compressed frictional engagement in an adjoining one of said grooves in the outer ring,
    said second end portion having a metallic ring insert
    L-shaped in cross section with a first leg portion extending toward said groove in said outer ring and a second leg portion extending outwardly from said first leg portion,
    said sealing members each further comprising a connecting wall between said end portions and providing a hinge,
    said connecting wall extending outwardly from the grooves of each of said rings,
    said second leg portion of said metallic ring insert stiffening said connecting wall,
    said sealing members upon relative movement of said spherical surfaces being compressed at one portion thereof while being expanded at an opposite portion thereof.

2. A self-aligning bushing as defined in claim 1 in which said groove in said outer spherical surface of said inner ring has a wall portion for limiting movement of said connecting wall upon a predetermined amount of relative movement of said spherical surfaces.

* * * * *

UNITED STATES PATENT OFFICE
CERTIFICATE OF CORRECTION

Patent No. 4,109,976  Dated August 29, 1978

Inventor(s) Hans W. Koch

It is certified that error appears in the above-identified patent and that said Letters Patent are hereby corrected as shown below:

Column 1

Line 36, after "as" and before "in", change "shwon" to - shown -

Column 2

Line 65, after "32" insert - are -

Signed and Sealed this

Thirteenth Day of February 1979

[SEAL]

Attest:

RUTH C. MASON
*Attesting Officer*

DONALD W. BANNER
*Commissioner of Patents and Trademarks*